Figure 1:
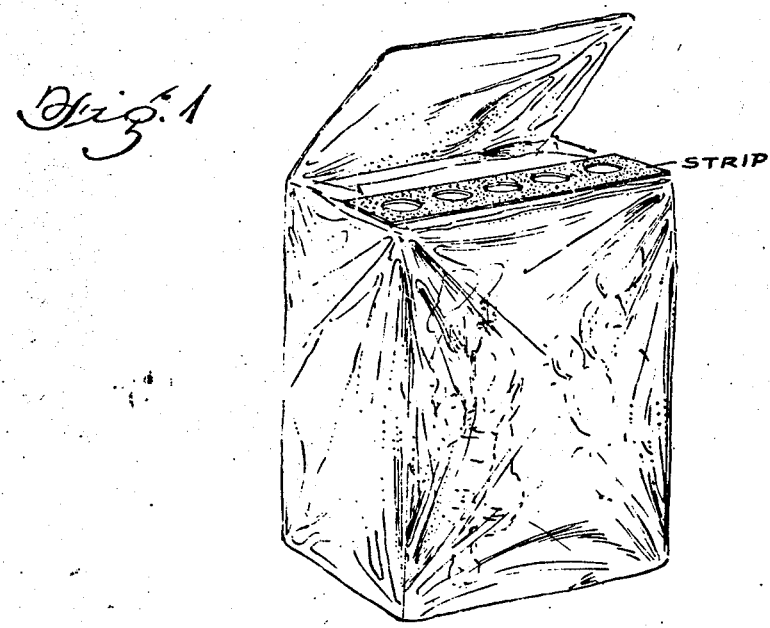

Dec. 16, 1952   H. W. CLOWE ET AL   2,622,053
METHOD OF JOINING SURFACES OF HEAT-FUSIBLE MATERIALS
Filed Dec. 4, 1945

INVENTORS
Henry W. Clowe
and Peter King
BY
ATTORNEY

Patented Dec. 16, 1952

2,622,053

UNITED STATES PATENT OFFICE 2,622,053

METHOD OF JOINING SURFACES OF HEAT-FUSIBLE MATERIALS

Henry W. Clowe, United States Army, and Peter King, Washington, D. C.

Application December 4, 1945, Serial No. 632,779

4 Claims. (Cl. 154—116)

(Granted under the act of March 3, 1883, as amended April 30, 1928; 370 O. G. 757)

The invention described herein, if patented may be manufactured and used by or for the Government for governmental purposes, without the payment to us of any royalty thereon.

This invention relates to a method for uniting or adhering overlapping edges of transparent or translucent pigmented or colored heat fusible film-like materials which are substantially non-absorbent to electromagnetic radiations, such as infrared rays, and more particularly to a method of sealing overlapping edges of bags, overwraps for packages or the like formed from such materials.

Because of the numerous advantages which they possess, use of various types of film-like material such as polyethylene, polyvinylidiene chloride, ethyl cellulose, polyvinyl chloride and acetate or their co-polymers and Pliofilm has been suggested both as an overwrap for other packages, such as cigarette packages, and as bags or containers for packaging commodities of all kinds or even as a liner for boxes or other types of containers, but a disadvantage inherent in such materials is the difficulty experienced in securing the edges together to seal the bag or the like. Many of the adhesives commonly used in the packaging art do not adhere strongly to these films, but thermoplastic adhesives have been successfully used in sealing overlapping edges of these and other film materials generally similar to those above mentioned. It has also been a common practice to cover both sides of wrappers of this type with a wax-like coating and this is usually a thermoplastic so that a joining of the overlapping edges of a wrapper may be obtained by heating these overlapping edges until the coating on the contacting surfaces melts and fuses. This produces a seal, but it is rather weak because of the thinness of the coating.

The strongest seal between overlapping plies is that produced by heating the contacting surfaces of the plies until they fuse or coalesce and then allowing them to cool. Heretofore it has been difficult to accomplish this because, in the means proposed for accomplishing it, heat was introduced from and applied to the outside surface of the film instead of the contacting surfaces. So much heat must be applied to the film in such a case to heat the contacting surfaces sufficiently to produce fusion therebetween that the material is weakened, and in some cases a melting through of the film occurs before a seal is effected because of the relatively narrow melting range of these films. For these reasons and because of the length of time required to heat the film to the fusion temperature when heat is applied from the outside, these materials have not been adaptable for use in automatic wrapping, packaging or wrapper-forming machines where it is desired to fuse overlapping edges directly to each other.

It has been found that when heat is applied to the contacting surfaces of the plies which are to be joined face to face instead of being applied to the outside surface of those plies and when the application of heat is limited to those areas which are to be joined an entirely satisfactory seal can be rapidly formed. This invention is concerned with a method for applying heat in the foregoing manner to overlapping edges of packages, bags and overwraps of all kinds formed from the above-mentioned films thus making it possible to use the films in automatic packaging, wrapping and wrapper-forming machines.

In the practice of the method of this invention, advantage is taken of a known characteristic of films of the type here involved, namely, the fact that they transmit electromagnetic radiations, such as infrared rays, with no appreciable absorption and as a result, are not noticeably heated thereby. However, these same films when coated with a vehicle containing carbon black, or any other material which absorbs the radiations and prevents their passage through the film unimpeded, will be rapidly heated when subjected to electromagnetic radiations along those portions which are coated. Thus by applying a coating of carbon black or other absorbent material on one or both of the surfaces of the two plies of films of this type along the portions which are to be joined face to face and then subjecting the film to electromagnetic radiations, such as infrared rays, while the adjoining faces of the plies are held in contact, a coalescence or fusion of the layers is produced along the coated portion without affecting the uncoated portions of the film. In this manner, a bond or seal which is sturdy, air-tight and dustproof can be rapidly produced.

This can also be accomplished by using an absorbent material in the form of a ply or film and applying it to the plies of film-like wrapper. When such a film is to be used, it is cut into strips which will define the seams it is desired to make and it is then placed in interposed relation with respect to the surfaces of the plies which are to be sealed and the plies subjected to electromagnetic radiation until fusion occurs. The material forming these strips may be of such composition that the strips fuse with the plies of film which are being sealed or they may be of a non-fusible material in which case they should be perforated so that the plies of film may fuse through the perforations.

Accordingly, it is an object of the invention to provide a new and improved method for heat sealing a ply of heat-fusible material to another surface of the same or a different material in which heat is applied directly to the surfaces to be joined.

Another object of the invention is the provision of a new and improved method for producing a seam between the contiguous faces of overlapping plies of heat-fusible overwrapping material or the like in which heat is developed directly on the surfaces to be joined sufficient to raise the temperature of the plies to the point where fusion occurs without requiring the transmission of heat from the outside of the plies to the surfaces being fused.

A further object of the invention is the provision of a new and improved method for heat sealing the contiguous faces of overlapping plies of heat-fusible transparent or translucent material in which heat is developed and applied between the surfaces to be joined by means of electromagnetic radiations such as infrared rays.

A still further object of the invention is the provision of a new and improved method as above set forth which may be carried out on high-speed automatic wrapping and packaging machines with very little modification of such machines as now constructed.

Still another object of the invention is the provision of a new and improved method by the application of which an air-tight and dustproof seal may be produced between plies of heat-fusible film in a rapid and inexpensive manner without sacrificing any of the advantages of other methods of sealing such as strength, durability and neat appearance.

These and other objects of the invention will become apparent from the following description in which the method is set forth as applied to a wrapper of sheet material such as polyethylene film. This is one of the newer materials of this type and because of its tenacious character, it has been found to be particularly suited for use as a water and dustproof overwrap for all sorts of objects and packages except for the fact that difficulty has been incurred in sealing the open ends of an overwrap of this material to make them water and dustproof.

A method in which heat is applied from the outside and conducted through the film to the surface which is to be joined to another cannot be employed successfully because as previously explained this method is too slow for use in automatic machinery. Furthermore, it results in overheating and resultant weakening of the film at the seam due to deterioration and even a melting through of the film in some cases. Likewise the seam areas cannot be heated by electromagnetic radiations because these films do not absorb sufficient radiant energy to be heated thereby to a temperature where fusion will occur, and moreover, when an attempt is made to use either of these two methods, the seam areas are not definitely defined. However, these difficulties have been overcome in the method set forth in detail hereinafter as an example of one application of the present invention. By the use of this method it is possible to seal heat-fusible overwrapping materials in a rapid and entirely satisfactory manner either by hand or on automatic machinery.

The package to be wrapped may be any design or shape normally wrapped with the usual wrapping materials. The wrapping and sealing operation to be described may be carried out by hand or upon an automatic wrapping machine, substantially the same steps being carried out in each case.

Polyethylene film suitable for use in wrapping is transparent or translucent and may be pigmented, colored or bear legends as desired. After being cut to the proper size it is wrapped around the package. A material absorbent to electromagnetic radiations is applied to those surfaces of the film which form the contacting portions of each overlap, tuck and fold either prior to the commencement of the actual wrapping operation or as the wrapping progresses, and the wrapper is held in folded position upon the package with the faces of the film which are to be joined held in contacting relation. Experiments have shown that electromagnetic radiations or radiant energy in the form of infrared rays are particularly effective for carrying out the method because such rays are not absorbed by uncoated polyethylene, but are readily absorbed by such common materials as carbon black and when absorbed produce in the film a rapid rise in temperature along the coated portions of the film.

Upon completion of the folding operation, and with the overwrap held as above stated, it is subjected to electromagnetic radiations, preferably infrared rays, for a period of time sufficient to heat the contacting surfaces to the point where they soften and coalesce or fuse together along the seam areas of the contiguous faces. This completes the wrapping operation. The length of exposure is determined by such variable factors as the relative thickness of the polyethylene film, the number of folds pressed together along an overlap, the relative transparency of the film and the intensity of the radiations, but where these factors are constant no appreciable variation exists in the length of exposure required to effect coalescence, therefore the method can be carried out in automatic wrapping or packaging machines.

It has been found that any substance containing carbon black, such as a common carbon containing ink, forms a suitable absorbent material for absorbing infrared rays but other absorbent materials may also be used. One very effective absorbent compound is made by dissolving polyethylene in hot toluene and then adding carbon black to this liquid vehicle. This mixture, which dries instantly upon cooling, is applied while hot along those areas of the film at which the seal is to be formed in the completed overwrap and on that side or face of the film which, in the folding operation, will be brought into contiguous relation with the side or face of the film to which it is sealed in the completed overwrap so that the coating of absorbent material is in interposed relation with respect to adjoining plies of film which are to be sealed together. If desired the mixture may be placed on both plies of the film along the seam areas on the contiguous faces thereof, but a coating on one face only has been found to be sufficient.

As previously indicated, a strip or film of absorbent material may be used in place of the liquid coating material above described. It has been found that a strip of the same material as that of which the films being sealed is made, but coated or compounded with radiant energy absorbent material, is particularly suitable for this purpose because it fuses with contacting plies and produces a firm seal in a very short time. When this type of absorbent material is used, it is cut into strips of length and width proper for defining the seam areas between the films which are to be sealed. At any convenient period in the wrapping operation, they are joined to, or positioned on, the overwrapping material along those areas at which the seam is to be formed and on that side which will result in their being positioned in interposed relation with respect to the plies of overwrapping material which are to be sealed when the folding operation has been completed.

Generally it is preferable to use a seam-defining strip of the same material as the films being joined, but if this seam-defining strip is of a material that does not fuse with the film of the overwrap then the strip should be perforated so that the two surfaces of the overwrap can fuse through the perforations; if the perforations in the seam-defining strip are relatively small, the entire area of the surfaces covering the perforation will fuse, while if the perforations are relatively large, heat fusion will take place in the annular region of the surfaces adjacent the periphery of each perforation. Thus if it is desired to provide bags with stiff edges, this can be accomplished by using stiff seam-defining material for sealing the edges of the bags.

Figure 2:
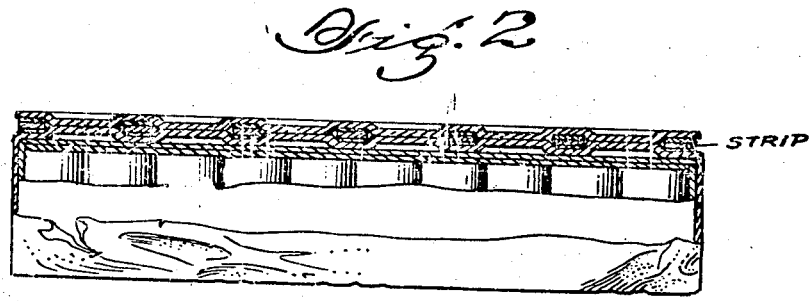
Figure 3:
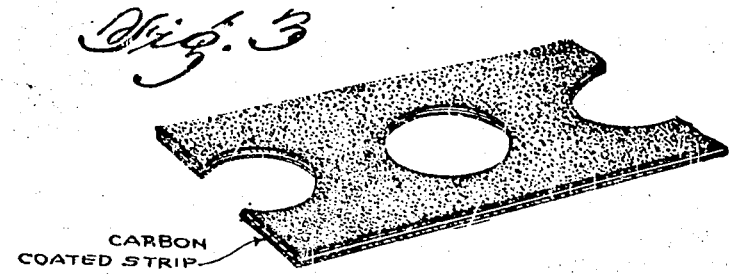

The accompanying drawings illustrate, by way of example, an overwrap and seam-defining strip in accordance with the present invention. Particularly, Figure 1 represents a perspective view of a conventional cigarette package, with heat sealable transparent overwrap and carbon-coated seam-defining strip, just prior to sealing;

Figure 2 represents a detailed partial view of the embodiment shown in Figure 1, in front elevation, partially broken away, after heat sealing; and Figure 3 is a perspective view of a portion of a perforated carbon-coated seam-defining strip as shown in Figures 1 and 2.

The mechanism used for producing electromagnetic radiations will depend on the particular range that is to be used. Generators for the infrared rays suggested for practicing the method of this invention are of known construction, a suitable type being manufactured by the General Electric Company. It is in the form of an electric bulb with suitable filament adapted to be connected in an electrical circuit including a rheostat or a transformer for regulating the current flowing to the generator and thereby regulating the intensity of the radiations generated. A parabolic or other reflector of polished metal or a system of mirrors or prisms may also be provided for concentrating or focusing the radiations to increase their intensity and to provide means for directing them to desired areas of the material being sealed.

Although the invention has been described at it would be carried out in the application of an overwrap to a package of a type similar to an ordinary cigarette package, it is not limited to this particular application. Substantially the same method may be used in forming bags upon automatic machinery. In such a process the transparent film is formed into a continuous tube having overlapping longitudinal edges which can be sealed in the manner above described as a continuous operation. This tube is then severed into bag lengths and one end of each length is folded and sealed according to the method herein set forth to form the bottom for a bag.

It is to be understood that the invention is not limited to the sealing of packages, bags or overwraps. Labels, strips, bands and the like may be applied to packages by this method, and in fact, it may be used in any operation where the surfaces of two sheets of transparent, translucent or colored heat-fusible material are to be secured together or where a sheet of such material is to be fixed to the surface of another material. Having thus described the invention, what is claimed to be new and for which protection is sought is set forth in the following claims:

1. The method of forming a seam by heat-sealing with radiant energy between the surface of a heat-fusible material transparent or translucent to electromagnetic radiations and a second surface of the same or a different material which comprises forming a seam-defining strip from perforated radiant energy absorbent material conforming to the seam areas between said surfaces, said radiant energy absorbent material being non-fusible at heat-sealing temperature, positioning said seam-defining strip in interposed relation with respect to said surfaces and then heat-sealing said areas by subjecting said heat-fusible material to radiant energy while maintaining the areas of seam between said surfaces in contact until fusion of said surfaces occurs through the perforations in said seam-defining material.

2. The method according to claim 1, wherein said radiant energy absorbent material is carbon black.

3. A heat-sealed wrap comprising heat-fusible and radiant-energy-permeable wrapping material including a limited heat-sealed area wherein at least two plies of said heat-fusible material are superimposed, and a strip containing a radiant energy absorbent material disposed between said plies in said heat-sealed area only, said radiant energy absorbent material being infusible at heat-sealing temperatures, said strip being perforated and said plies being fused through the perforations in said strip.

4. A heat-sealed wrap according to claim 3, wherein said radiant-energy absorbent material is carbon black.

HENRY W. CLOWE.
PETER KING.

REFERENCES CITED

The following references are of record in the file of this patent:

UNITED STATES PATENTS

| Number | Name | Date |
|---|---|---|
| 2,087,236 | Anders | July 20, 1937 |
| 2,236,685 | Hallman | Apr. 1, 1941 |
| 2,236,754 | Gurwick | Apr. 1, 1941 |
| 2,281,280 | Gabor | Apr. 28, 1942 |
| 2,393,541 | Kohler | Jan. 22, 1946 |
| 2,402,631 | Hull | June 25, 1946 |
| 2,407,833 | Jablonsky | Sept. 17, 1946 |

FOREIGN PATENTS

| Number | Country | Date |
|---|---|---|
| 555,054 | Great Britain | Aug. 3, 1943 |